United States Patent
Chen

(10) Patent No.: US 6,879,844 B2
(45) Date of Patent: Apr. 12, 2005

(54) TELEPHONE DIALING APPARATUS CAPABLE OF DIRECTLY DOWNLOADING TELEPHONE DIRECTORY FROM MOBILE PHONE SUBSCRIBER IDENTITY MODULE CARD

(75) Inventor: Stephen Chen, Chang-Hua (TW)

(73) Assignee: E-Lead Electronic Co. Ltd., Chang-Hua (TW)

( * ) Notice: Subject to any disclaimer, the term of this patent is extended or adjusted under 35 U.S.C. 154(b) by 554 days.

(21) Appl. No.: 09/955,183

(22) Filed: Sep. 19, 2001

(65) Prior Publication Data
US 2003/0054860 A1 Mar. 20, 2003

(51) Int. Cl.⁷ .............................................. H04M 1/00
(52) U.S. Cl. ................ 455/558; 455/556.1; 379/355.01
(58) Field of Search ................................ 455/558, 556, 455/557, 403, 425, 550.1, 556.1, 566, 575.1; 379/355.01, 350, 354, 355.05

(56) References Cited

U.S. PATENT DOCUMENTS 4,266,102 A * 5/1981 Stanley et al. ............... 379/157
6,411,822 B1 * 6/2002 Kraft ........................... 455/558

FOREIGN PATENT DOCUMENTS

JP             411103338 A * 4/1999 ............ H04M/1/05

* cited by examiner

Primary Examiner—Melur Ramakrishnaiah
(74) Attorney, Agent, or Firm—Troxell Law Office, PLLC

(57) ABSTRACT

A telephone dialing apparatus capable of directly downloading electronic telephone directory from a mobile phone subscriber identity module (SIM) card to provide a telephone dialing function for different telephone systems use comprises a SIM card socket, a SIM card reader, a control unit, a memory unit, a dialing unit, a human-machine interface, an alarm unit and an information processing unit. The apparatus allows users free from repeatedly entering the electronic telephone directory. More than one telephone systems are allowed to utilize the mobile phone electronic telephone directory to perform dialing operations.

2 Claims, 3 Drawing Sheets

TELEPHONE DIALING APPARATUS CAPABLE OF DIRECTLY DOWNLOADING TELEPHONE DIRECTORY FROM MOBILE PHONE SUBSCRIBER IDENTITY MODULE CARD

BACKGROUND OF THE INVENTION

1. Field of the Invention

The invention relates to a telephone dialing apparatus capable of directly downloading telephone directory from a mobile phone Subscriber Identity Module (SIM) card and particularly a telephone dialing apparatus that is capable of reading electronic telephone directory in the mobile phone SIM card to allow different telephone systems to concurrently utilize the dialing function built in the mobile phone SIM card and to free users from repeatedly entering telephone numbers.

2. Description of the Prior Art

Mobile phones are very popular around the world nowadays. They are almost ubiquitous and have become an essential personal article to many people. In addition to increase communication convenience, the mobile phones also provide many extra function. All this helps to accelerate their explosive growth in recent years. The commonly used additional function include electronic telephone directory, fast dialing, image and text messaging, and the like. Among them, electronic telephone directory is the most popular application. The general telephone or communication systems mostly have fast dialing features to allow users to enter the frequently used telephone numbers in advance and then assign simpler corresponding codes. Users may enter these simpler codes to retrieve the completed telephone numbers from the memory and automatically perform dialing. It is a very convenient and useful function. Whereas, many people have more than one telephone at different locations, such as fixed line telephones at homes, personal mobile phones and office phones. The telephone directories at these different locations often do not coincide with one another. For instance, some telephone numbers are included in one directory but are absent in another directory. It is inconvenience when using. Moreover, many people have an earphone installed in the car to couple with the mobile phone. Users tend to place the dialing device on the steering wheel or use audio dialing features to make phone call. The earphone also has a telephone directory which often does not coincide with the mobile phone SIM card. As there are many different brands and types of mobile phones and earphones, and they often have different software which are often not compatible. It is very difficult to use the interface sockets of different types of mobile phones to directly download the telephone directory from the SIM card. As a result, users often have to enter telephone directory repeatedly. It is a tedious and time consuming job necessitates improvement.

SUMMARY OF THE INVENTION

In view of aforesaid disadvantages, the present invention aims at providing a solution to overcome the problem of incompatible electronic telephone directory between conventional mobile phone and other telephone systems.

The primary object of the invention is to provide a telephone dialing apparatus that is capable of directly downloading telephone directory from a mobile phone SIM card thereby to integrate the mobile phone and their communication peripherals (or two or more mobile phones) or fixed lines phones to achieve universal applicability.

The dialing apparatus according to the invention includes mainly a SIM card socket, a SIM card reader, a control unit, a memory unit, a dialing unit, a human-machine interface, an alarm unit and an information editing unit. The apparatus allows users to download the electronic telephone directory from the mobile phone SIM card and perform dialing operation. Hence users do not need to repeat the work of entering and editing telephone numbers.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
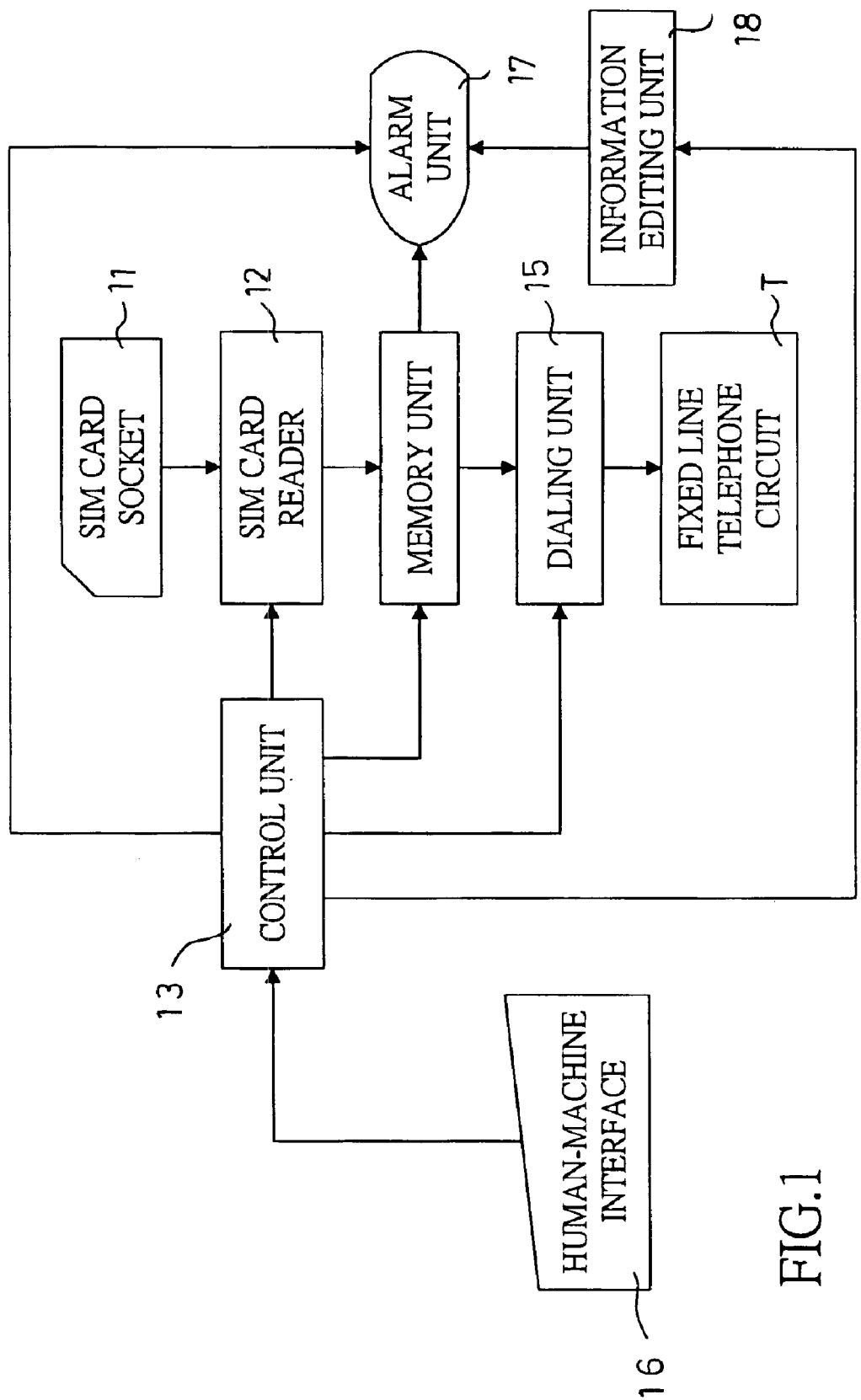
FIG. 1 is a structural block diagram of the invention adapted for a fixed line telephone.

Referring to FIG. 1, the apparatus of the invention is to link a fixed line telephone circuit T, and mainly includes a SIM card socket 11, a SIM card reader 12, a control unit 13, a memory unit 14, a dialing unit 15, a human-machine interface 16, an alarm unit 17 and an information editing unit 18.

The SIM card socket 11 is to couple with a mobile phone SIM card and to allow the SIM card reader 12 to read the data stored in the mobile phone SIM card.

The SIM card reader 12 includes communication protocols for mobile phones, and through the SIM card socket 1 1 to read the data stored in the mobile phone SIM card, and stores the data temporarily in the memory unit 14.

The control unit 13 is activated by the human-machine interface 16 to monitor and control the operations of various units of the apparatus.

The memory unit 14 is for temporarily storing telephone numbers, names, brief codes, and the like.

The dialing unit 15 outputs dialing signals to replace human dialing operations such as pressing the pushbuttons.

The human-machine interface 16 is a matrix array of pushbuttons, a dial plate, a touch screen or the like to allow users to activate the apparatus of the invention.

The alarm unit 17 allows users to view and inspect the operating conditions of the apparatus, search electronic telephone directory and browse information. The alarming may be presented in form of visual display or audio sound.

The information editing unit 18 allows users or the system to edit the received telephone information in the electronic telephone directory.

Figure 2:
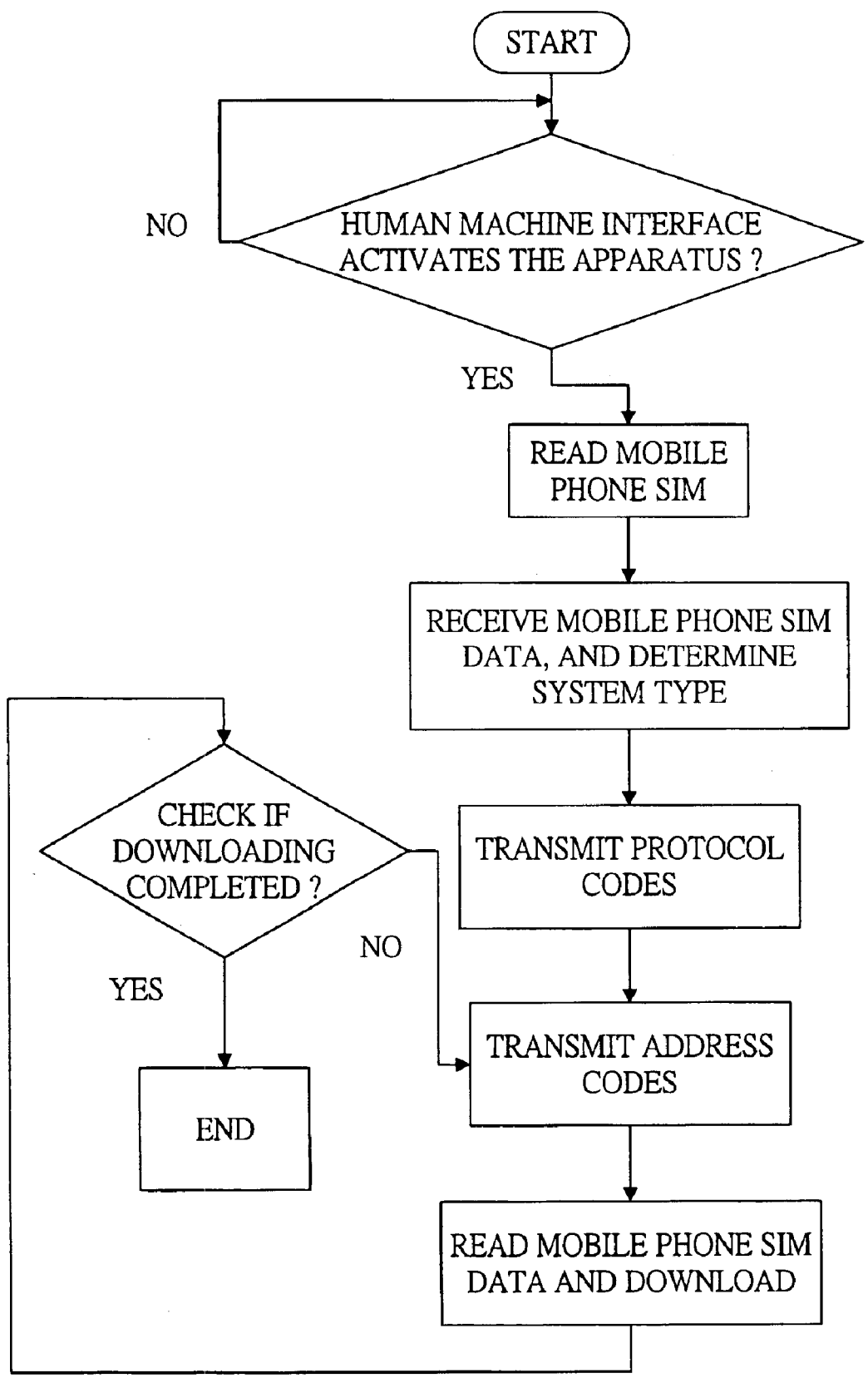
FIG. 2 is a processing flow chart for reading data from a mobile phone SIM card according to the invention.

The apparatus thus constructed then is linked to a fixed line telephone circuit (T) (the fixed line telephone circuits are known in the art and forms no part of the invention, thus will be omitted here). When in use, users plug the mobile phone SIM card in the SIM socket 11, and proceed the operation according to the processing flow shown in FIG. 2 to download data from the mobile phone SIM card to the apparatus of the present invention. The processing include the following steps:

1. Start.
2. Determine if the user utilizes the human machine interface 16 to activate the apparatus, if negative, repeat step 1; if positive, activate the control unit 13 which will output a signal requesting the SIM card reader 12 to read data contained in the mobile phone SIM card.

3. The SIM card reader 12, after activated by the control unit 13, outputs a test signal through the SIM card socket 11 to determine what type of system and protocol the mobile phone SIM card belongs.

4. After confirmation, output the protocol codes for reading data in the mobile phone SIM card.

5. Transmit address codes which represent the storage addresses of every piece of data, also called transaction flag marks, such as first transaction, second transaction, etc. for the invention to download completely every piece of telephone data contained in the mobile phone SIM card.

6. The SIM card reader 12 reads the data contained in the address codes from the mobile phone SIM card to the memory unit 14. During downloading the telephone numbers, the SIM card reader will remove local long distance identification codes (a pseudo removing, only when storing in the fixed telephone will the long distance area code be removed from the original numbers).

7. Determine if all the data in the mobile phone SIM card have been completely downloaded. If positive, end the processing. If negative, repeat the step 5.

After the contents of the mobile phone SIM card have been completely downloaded, the data may be displayed on the alarm unit 17. Users may utilize the human-machine interface 16 and through the information editing unit 18 to do inquiry or editing. For dialing a telephone number, utilize the human-machine interface 16 to activate the dialing unit 15 which is controlled by the control unit 13, then the currently displaying telephone numbers on the alarm unit 17 will be switched to dialing signals, and through the fixed telephone circuit T to establish telephone connection.

Figure 3:
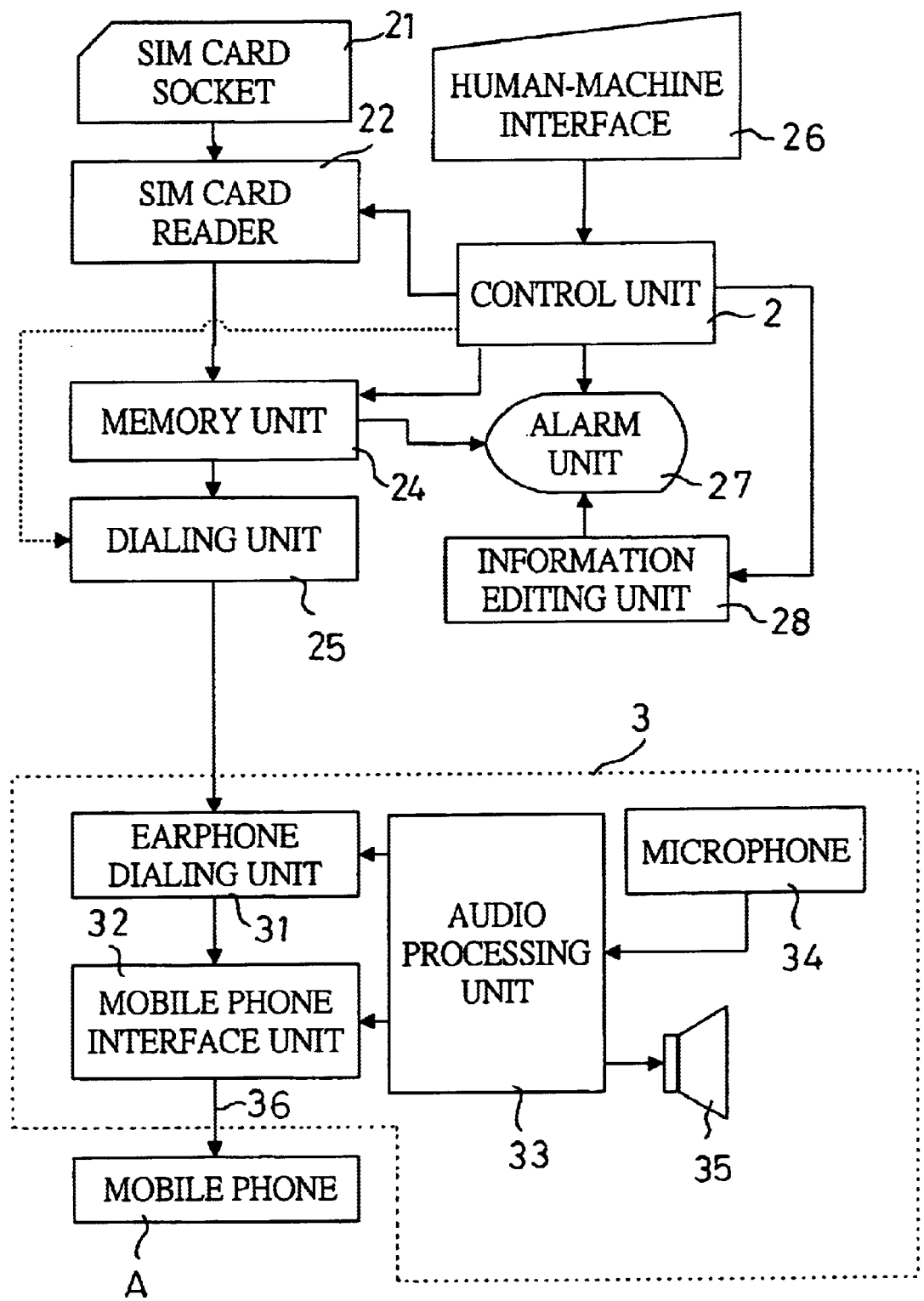
FIG. 3 is a structural block diagram of the invention adapted for an earphone.

FIG. 3 illustrates a second embodiment of the invention. As mobile phones become very popular these days, to build mobile communication capability in the cars is a trendy concept. Many contemporary cars have equipped with car phones. Or some users have more than one mobile phone. When to make phone call in the cars, there is no ready solution to allow different mobile phones to access and use the telephone directory stored in the mobile phone SIM card. The present invention offers a solution to attack this problem that is described in the second embodiment. The apparatus of the second embodiment consists of a SIM card socket 21, a SIM card reader 22, a control unit 23, a memory unit 24, a dialing unit 25, a human-machine interface 26, an alarm unit 27 and an information editing unit 28. All these units are assembled and constructed to couple with an earphone circuit.

The SIM card socket 21 is to couple with a mobile phone SIM card and to allow the SIM card reader 22 to read the data stored in the mobile phone SIM card.

The SIM card reader 22 includes communication protocols for mobile phones, and through the SIM card socket 21 to read the data stored in the mobile phone SIM card, and stores the data temporarily in the memory unit 24.

The control unit 23 is activated by the human-machine interface 26 to monitor and control the operations of various units of the apparatus.

The memory unit 24 is for temporarily storing telephone numbers, names, brief codes, and the like.

The dialing unit 25 outputs dialing signals to replace human dialing operations such as pressing the pushbuttons.

The human-machine interface 26 is a matrix array of pushbuttons, a dial plate, a touch screen or the like to allow users to activate the apparatus of the invention.

The alarm unit 27 allows users to view and inspect the operating conditions of the apparatus, search electronic telephone directory and browse information. The alarming may be presented in form of visual display or audio sound.

The information editing unit 28 allows users or the system to edit the received telephone information in the electronic telephone directory.

The earphone circuit 3 of the invention includes an earphone dialing unit 31, a mobile phone interface unit 32, an audio processing unit 33, a microphone 34 and a speaker 35. The earphone dialing unit 31 allows an external dialing device to input dialing signals. The mobile phone interlace unit 32 performs signal conversion between a mobile phone A and the earphone 3, and are linked by a signal cable 36. The audio processing unit 33 performs audio input and output processes, such as echoes, noises, signal amplification (or screening, checking or the like). The microphone 34 is to allow users to enter voice input. The speaker 35 is to broadcast audio voice for the earphone.

The construction set forth above allows users to download data from another mobile phone SIM card to a car phone in the car. It can also be adapted to the earphone to conform to regulations on mobile phone utilization in the cars. The operation processes of the second embodiment are substantially same as those shown in FIG. 2, thus will be omitted here. After downloading of the mobile phone SIM card data is completed, users may utilize the human-machine interface 26 and through the information editing unit 28 to do inquiry or editing. For dialing a telephone number, utilize the human-machine interface 26 to activate the dialing unit 25 which is controlled by the control unit 23, then the currently displaying telephone numbers on the alarm unit 27 will be transformed to signals acceptable to the earphone 3, and through the earphone dialing unit 31 to output dialing signals and telephone numbers to proceed dialing operations. Thus users may have the benefits and conveniences of mobile phone communication in the cars.

The descriptions set forth above show that the present invention can effectively resolve the data incompatibility problem of conventional mobile phone SIM cards. Users need to enter telephone numbers only once, and through the invention, the phone numbers may be commonly shared by various telephone systems. It thus offers great improvements and gives more conveniences to users.

While the preferred embodiments of the invention have been set forth for the purpose of disclosure, modifications of the disclosed embodiments of the invention as well as other embodiment thereof may occur to those skilled in the art. Accordingly, the appended claims are intended to cover all embodiments which do not depart from the spirit and scope of the invention.

I claim:

1. A telephone dialing apparatus for downloading a telephone directory from a mobile phone subscriber identity module (SIM) card comprising:
   a) a SIM card socket connected to the mobile phone SIM card;
   b) a SIM card reader connected to the SIM card socket and having communication protocols of the mobile phone SIM card, the SIM card reader reads the telephone directory stored on the mobile phone SIM card;
   c) a memory unit connected to the SIM card reader for storing the telephone directory read by the SIM card reader;

d) a dialing unit connected to the memory unit outputting dialing signals;

e) a control unit connected to the SIM card reader, the SIM card reader, the memory unit, the dialing unit;

f) an information editing unit connected to the control unit for editing the telephone directory stored in the memory unit;

g) an alarm unit connected to and displaying information from the control unit, the memory unit and the information editing unit, the alarm unit generates audible and visual alarms; and h) a human-machine interface connected to and controlling the control unit, wherein the dialing unit is connected to a fixed line telephone circuit receiving dialing signals from the dialing unit to dial a phone number from the telephone directory of the mobile phone SIM card.

2. A telephone dialing apparatus for downloading a telephone directory from a mobile phone subscriber identity module (SIM) card comprising:

a) a SIM card socket connected to the mobile phone SIM card;

b) a SIM card reader connected to the SIM card socket and having communication protocols of the mobile phone SIM card, the SIM card reader reads the telephone directory stored on the mobile phone SIM card;

c) a memory unit connected to the SIM card reader for storing the telephone directory read by the SIM card reader;

d) a dialing unit connected to the memory unit outputting dialing signals;

e) a control unit connected to the SIM card reader, the SIM card reader, the memory unit, the dialing unit;

f) an information editing unit connected to the control unit for editing the telephone directory stored in the memory unit;

g) an alarm unit connected to and displaying information from the control unit, the memory unit and the information editing unit, the alarm unit generates audible and visual alarms; and h) a human-machine interface connected to and controlling the control unit, wherein the dialing unit is connected to an earphone circuit that is connected to a mobile phone, the earphone circuit receiving dialing signals from the dialing unit to dial a phone number.

* * * * *